(12) United States Patent
Paul et al.

(10) Patent No.: US 10,025,580 B2
(45) Date of Patent: Jul. 17, 2018

(54) SYSTEMS AND METHODS FOR SUPPORTING MULTIPLE OPERATING SYSTEM VERSIONS

(71) Applicant: Dell Products L.P., Round Rock, TX (US)

(72) Inventors: Matthew Christian Paul, Round Rock, TX (US); Trung Minh Tran, Round Rock, TX (US); Muhammad Rahman, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 13/748,103

(22) Filed: Jan. 23, 2013

(65) Prior Publication Data
US 2014/0208302 A1    Jul. 24, 2014

(51) Int. Cl.
G06F 9/445    (2018.01)
G06F 8/65    (2018.01)
G06F 9/455    (2018.01)

(52) U.S. Cl.
CPC ............ *G06F 8/65* (2013.01); *G06F 9/45533* (2013.01)

(58) Field of Classification Search
CPC ................ G06F 7/78; G06F 8/00–8/78; G06F 9/44–9/455; G06F 11/36
USPC .................................................. 717/100–178
See application file for complete search history.

(56) References Cited

U.S. PATENT DOCUMENTS

| | | | | |
|---|---|---|---|---|
| 7,930,733 | B1 * | 4/2011 | Iftode ..................... | G06F 21/52 711/152 |
| 8,955,152 | B1 * | 2/2015 | Enderwick .............. | G06F 21/60 705/51 |
| 2005/0257212 | A1 * | 11/2005 | Boyles ..................... | G06F 8/61 717/170 |
| 2006/0161910 | A1 * | 7/2006 | Bonsteel et al. .............. | 717/170 |
| 2008/0256530 | A1 * | 10/2008 | Armstrong .......... | G06F 9/45533 717/174 |
| 2008/0320460 | A1 * | 12/2008 | Miller ...................... | G06F 8/71 717/162 |

(Continued)

OTHER PUBLICATIONS

Xia et al., Architecture Support for Guest Transparent VM Protection from Untrusted Hypervisor and Physical Attacks, 2013 (Year: 2013).*

(Continued)

*Primary Examiner* — S. Sough
*Assistant Examiner* — Zhan Chen
(74) *Attorney, Agent, or Firm* — Jackson Walker L.L.P.

(57) ABSTRACT

In accordance with embodiments of the present disclosure, a method may include querying, by an application program executing on a first information handling system, a second information handling system remotely coupled to the first information handling system for data comprising identities of versions or patches of an operating system certified by a provider of the operating system. The method may also include receiving the data in response to the query. The method may further include updating a support matrix associated with the application program based on the identities of certified versions or patches, the support matrix setting forth identities of versions or patches of the operating system supported by the application program.

10 Claims, 3 Drawing Sheets

(56) References Cited

U.S. PATENT DOCUMENTS

| | | | |
|---|---|---|---|
| 2009/0094595 A1* | 4/2009 | Garrett | G06F 9/4446 717/174 |
| 2009/0172781 A1* | 7/2009 | Masuoka | H04L 63/105 726/3 |
| 2010/0281273 A1* | 11/2010 | Lee | G06F 21/72 713/190 |
| 2010/0287542 A1* | 11/2010 | Neft | 717/140 |
| 2011/0161952 A1* | 6/2011 | Poddar et al. | 717/173 |
| 2011/0246764 A1* | 10/2011 | Gamez | G06F 21/41 713/155 |
| 2012/0198436 A1* | 8/2012 | Preimesberger | G06F 8/61 717/174 |
| 2013/0212461 A1* | 8/2013 | Sarangapani | G06F 11/3608 715/234 |

OTHER PUBLICATIONS

Giuffrida et al., Safe and Automatic Live Update for Operating Systems, 2013 (Year: 2013).*

Cheng et al., AppShield Protecting Applications against Untrusted Operating System, 2013 (Year: 2013).*

* cited by examiner

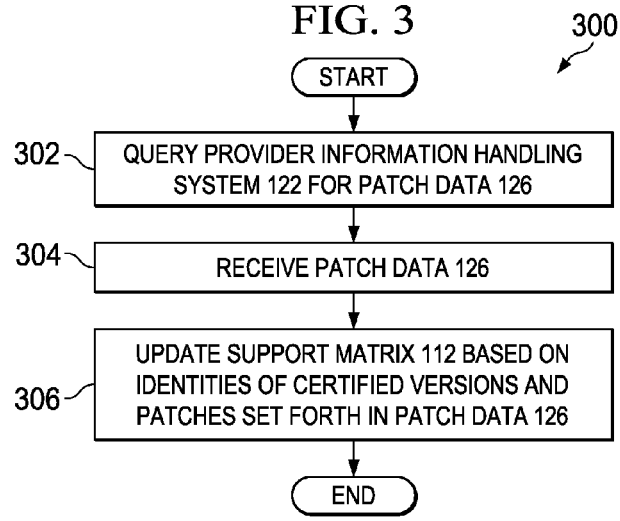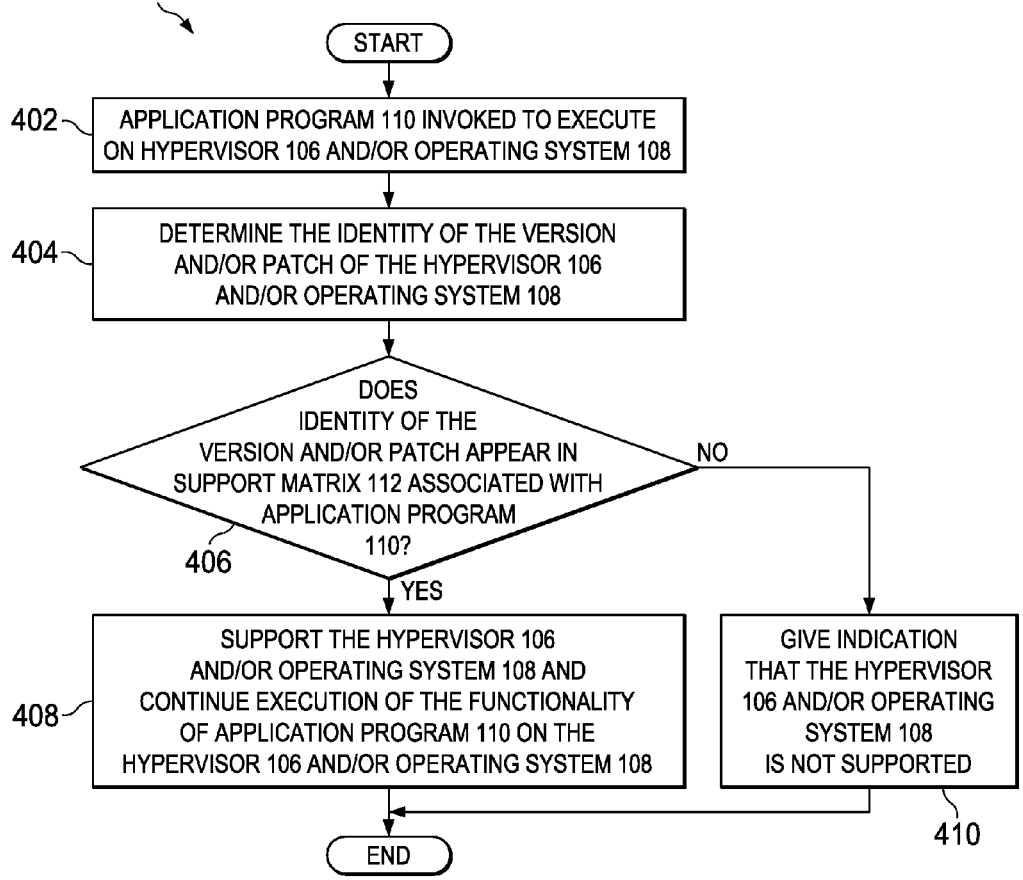

SYSTEMS AND METHODS FOR SUPPORTING MULTIPLE OPERATING SYSTEM VERSIONS

TECHNICAL FIELD

The present disclosure relates in general to information handling systems, and more particularly to providing support by an application program for multiple operating system versions.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Often, hypervisor and operating system "patches" may be released frequently in order to overcome a system bug or security flaw. When released, such patches are typically deployed in an information handling system having such hypervisors or operating systems in order. However, for application programs that execute on the hypervisor or operating system, the proliferation of many patches may be problematic, as an application program must verify that the new patch is certified as a legitimate release promulgated by the provider or the hypervisor or operating system and also keep an accounting of which patches are certified and thus supported by the application program.

Historically, support for patch builds required re-coding and re-compilation of program code of an application program. Such approach may be cumbersome, time-consuming, and costly.

SUMMARY

In accordance with the teachings of the present disclosure, the disadvantages and problems associated with supporting multiple operating system versions have been reduced or eliminated.

In accordance with embodiments of the present disclosure, an information handling system may include a processor and an application program comprising one or more instructions embodied in computer-readable media communicatively coupled to the processor. The instructions may cause the processor to, when read and executed by the processor: (i) query a second information handling system remotely coupled to the information handling system for data comprising identities of versions or patches of an operating system certified by a provider of the operating system; (ii) receive the data in response to the query; and (iii) update a support matrix associated with the application program based on the identities of certified versions or patches, the support matrix setting forth identities of versions or patches of the operating system supported by the application program.

In accordance with these and other embodiments of the present disclosure, a method may include querying, by an application program executing on a first information handling system, a second information handling system remotely coupled to the first information handling system for data comprising identities of versions or patches of an operating system certified by a provider of the operating system. The method may also include receiving the data in response to the query. The method may further include updating a support matrix associated with the application program based on the identities of certified versions or patches, the support matrix setting forth identities of versions or patches of the operating system supported by the application program.

In accordance with these and other embodiments of the present disclosure, an information handling system may include a processor and an application program comprising one or more instructions embodied in computer-readable media communicatively coupled to the processor. The instructions may cause the processor to, when read and executed by the processor: (i) upon invocation of the application program, determine an identity of a version or patch of an operating system upon which the application program is executing; (ii) determine if the identity of the version or patch is set forth in a support matrix associated with the application program, the support matrix setting forth identities of versions or patches of the operating system supported by the application program; (iii) responsive to determining that the identity of the version or patch is set forth in the support matrix, continue supported execution of the application program on the operating system; and (iv) responsive to determining that the identity of the version or patch is set forth in the support matrix, provide an indication that the operating system is not supported.

In accordance with these and other embodiments of the present disclosure, a method may include upon invocation of an application program, determining an identity of a version or patch of an operating system upon which the application program is executing. The method may also include determining if the identity of the version or patch is set forth in a support matrix associated with the application program, the support matrix setting forth identities of versions or patches of the operating system supported by the application program. The method may additionally include responsive to determining that the identity of the version or patch is set forth in the support matrix, continuing supported execution of the application program on the operating system. The method may further include responsive to determining that the identity of the version or patch is set forth in the support matrix, providing an indication that the operating system is not supported.

Technical advantages of the present disclosure will be apparent to those of ordinary skill in the art in view of the following specification, claims, and drawings.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein:

FIG. 3 illustrates a flow chart of an example method for building a support matrix associated with an application program, in accordance with embodiments of the present disclosure; and FIG. 4 illustrates a flow chart of an example method for applying a support matrix associated with an application program, in accordance with embodiments of the present disclosure.

DETAILED DESCRIPTION

Figure 1:
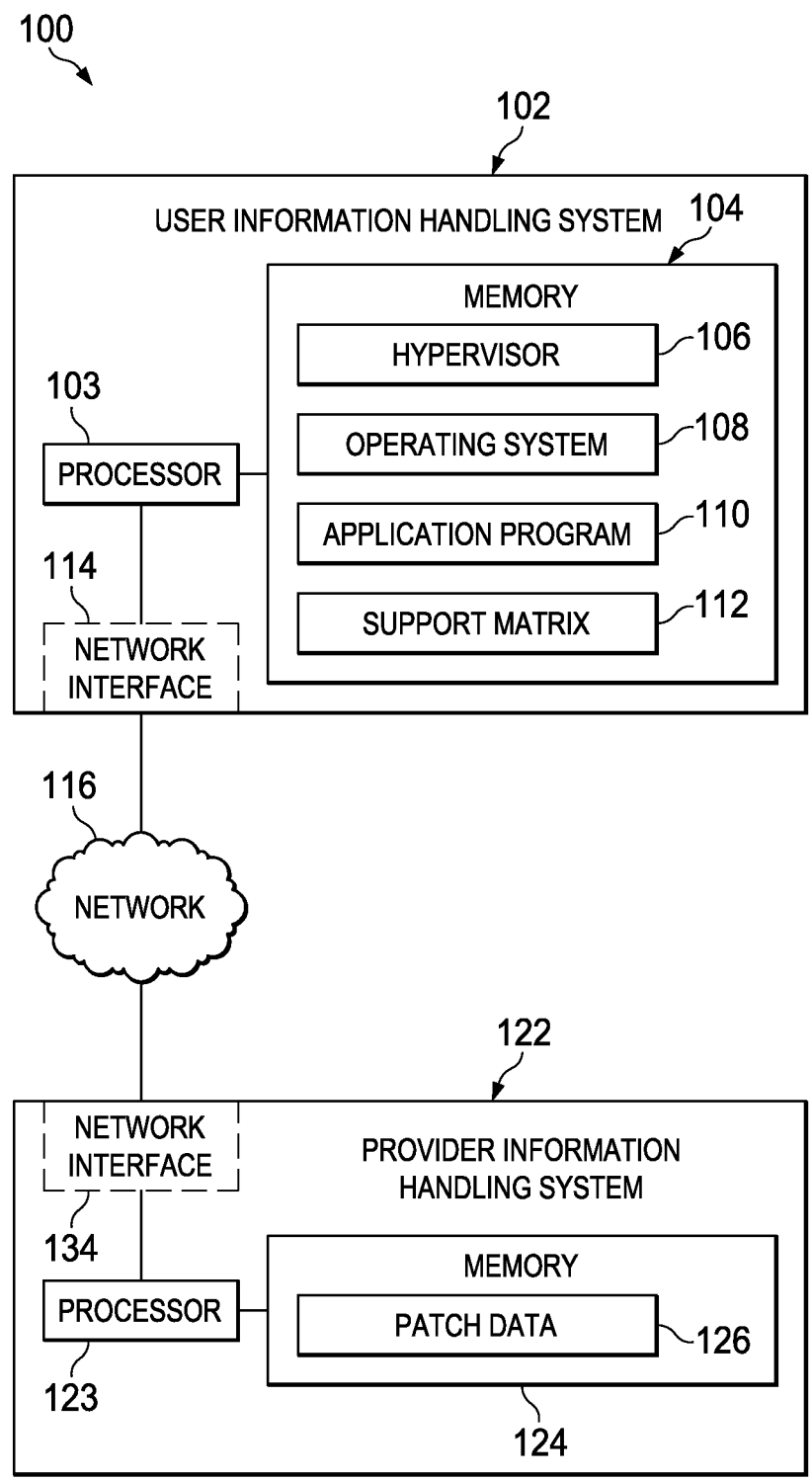
FIG. 1 illustrates a block diagram of an example system for supporting multiple operating system versions, in accordance with embodiments of the present disclosure.

Preferred embodiments and their advantages are best understood by reference to FIGS. 1 through 4, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more busses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems, busses, memories, I/O devices and/or interfaces, storage resources, network interfaces, motherboards, and/or any other components and/or elements of an information handling system.

For the purpose of this disclosure, an operating system may be any program of executable instructions, or aggregation of programs of executable instructions, configured to manage and/or control the allocation and usage of information handling resources (e.g., processors, memories, user interfaces, and/or other information handling resources) and provide an interface between such information handling resources and application programs hosted by the operating system, and thus may act as a host for an application program to be executed by an information handling system upon which the operating system is installed. Examples of operating systems may include, without limitation, Windows, MacOS, UNIX, and LINUX.

FIG. 1 illustrates a block diagram of an example system 100 for supporting multiple operating system versions, in accordance with certain embodiments of the present disclosure. As shown in FIG. 1, system 100 may include a user information handling system 102, a network 116, and a provider information handling system 122. In some embodiments user information handling system 102 may comprise a server. In other embodiments, information handling system 102 may be a personal computer (e.g., a desktop computer, a laptop, notebook, tablet, handheld, smart phone, personal digital assistant, etc.). As depicted in FIG. 1, information handling system 102 may include a processor 103, a memory 104 communicatively coupled to processor 103, and a network interface 114 communicatively coupled to processor 103. In addition to processor 103, memory 104 and network interface 114, information handling system 102 may include one or more other information handling resources.

Processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104 and/or another component of information handling system 102.

Memory 104 may be communicatively coupled to processor 103 and may include any system, device, or apparatus configured to retain program instructions and/or data for a period of time (e.g., computer-readable media). Memory 104 may include RAM, EEPROM, a PCMCIA card, flash memory, magnetic storage, opto-magnetic storage, or any suitable selection and/or array of volatile or non-volatile memory that retains data after power to information handling system 102 is turned off.

As shown in FIG. 1, memory 104 may have stored thereon a hypervisor 106, one or more operating systems 108, one or more application programs 110, and one or more support matrices 112, each support matrix 112 associated with a corresponding application program.

Hypervisor 106 may comprise software and/or firmware generally operable to allow multiple operating systems to run on a single information handling system (e.g., information handling system 102) at the same time. This operability is generally allowed via virtualization, a technique for hiding the physical characteristics of information handling system resources from the way in which other systems, applications, or end users interact with those resources. Hypervisor 106 may be one of a variety of proprietary and/or commercially available virtualization platforms, including without limitation, VIRTUALLOGIX VLX FOR EMBED- DED SYSTEMS, IBM's Z/VM, XEN, ORACLE VM, VMWARE's ESX SERVER, L4 MICROKERNEL, TRANGO, MICROSOFT's HYPER-V, SUN's LOGICAL DOMAINS, HITACHI's VIRTAGE, KVM, VMWARE SERVER, VMWARE WORKSTATION, VMWARE FUSION, QEMU, MICROSOFT's VIRTUAL PC and VIRTUAL SERVER, INNOTEK's VIRTUALBOX, and SWSOFT's PARALLELS WORKSTATION and PARALLELS DESKTOP. In some embodiments, hypervisor 106 may comprise a specially designed operating system (OS) with native virtualization capabilities. In other embodiments, hypervisor 106 may comprise a standard OS with an incorporated virtualization component for performing virtualization.

In yet other embodiments, hypervisor 106 may comprise a standard OS running alongside a separate virtualization application. In such embodiments, the virtualization application of hypervisor 106 may be an application running above the OS and interacting with information handling resources 104 only through the OS. Alternatively, the virtualization application of hypervisor 106 may, on some levels, interact indirectly with information handling resources of information handling system 102 via the OS, and, on other levels, interact directly with information handling resources (e.g., similar to the way the OS interacts directly with information handling resources, or as firmware running on information handling resources). As a further alternative, the virtualization application of hypervisor 106 may, on all levels, interact directly with information handling resources (e.g., similar to the way the OS interacts directly with information handling resources 104, or as firmware running on information handling resources 104) without utilizing the OS, although still interacting with the OS to coordinate use of information handling resources.

To allow multiple operating systems to run on information handling system 102 at the same time, hypervisor 106 may virtualize the information handling resources of information handling system 102 and present virtualized computer hardware representations to each of one or more virtual machines. In other words, hypervisor 106 may assign to each of the virtual machines, for example, one or more processors, one or more regions of memory in a memory subsystem, one or more components of an I/O subsystem, one or more other components of information handling system 102, etc. The virtualized hardware representation presented to each of the virtual machines may comprise a mutually exclusive, or non-overlapping, set of information handling resources per virtual machine (e.g., no hardware resources are shared between virtual machines) or may comprise an overlapping set of hardware resources per virtual machine (e.g., one or more hardware resources may be shared by two or more virtual machines).

In some embodiments, hypervisor 106 may assign information handling resources statically (i.e., certain information handling resources are assigned to certain virtual machines, and this assignment does not vary over time). Additionally or alternatively, hypervisor 106 may assign information resources of information handling system 102 dynamically (i.e., the assignment of information handling resources to virtual machines varies over time, for example, in accordance with the specific needs of the applications running on the individual virtual machines). Additionally or alternatively, hypervisor 106 may keep track of the information-handling-resource-to-virtual-machine mapping, such that hypervisor 106 is able to determine the virtual machines to which any given information handling resource has been assigned.

Each of virtual machines may execute a guest operating system (guest OS) 108, along with any applications 110 or other software running on guest OS 108. Each guest OS 108 may be any OS compatible with and/or supported by hypervisor 106 (even if such guest OS 108 is generally incompatible with information handling system 102). In addition, each guest OS 108 may be a separate instance of the same operating system or an instance of different operating systems. For example, in one embodiment, each guest OS 108 may comprise a LINUX OS. As another example, one guest OS 108 may comprise a LINUX OS and another guest OS 108 may comprise a VXWORKS OS. Although memory 104 of information handling system 102 is depicted as having one operating system 108, any number of guest operating systems 108 may be present on memory 104 and executed by hypervisor 106 in order to support any number of virtual machines running on information handling system 102 at any given time.

Hypervisor 106 may virtualize the information handling resources of information handling system 102 and present virtualized hardware representations to each of the virtual machines executing under hypervisor 106. Each guest OS 108 of the virtual machines may then begin to operate and run application programs 110 and/or other software. While operating, each guest OS 108 may utilize one or more information handling resources of information handling system 102 assigned to the respective virtual machine by hypervisor 106.

An application program 110 may include a program of instructions configured to be read and executed by processor 103 to carry out a particular function or task.

A support matrix 112 may be associated with a corresponding application program 110, and may include any table, database, map, or other data structure setting forth various information handling resources, hypervisors, hypervisor versions, operating systems, and operating system versions for which execution of the corresponding application program 110 is supported. As described in greater detail below, an application program 110 may maintain its corresponding support matrix 112 based on patch data provided by a provider of a hypervisor or operating system, and verify support for various information handling resources, hypervisors, hypervisor versions, operating systems, and operating system versions based on data set forth in the support matrix 112.

Figure 2:
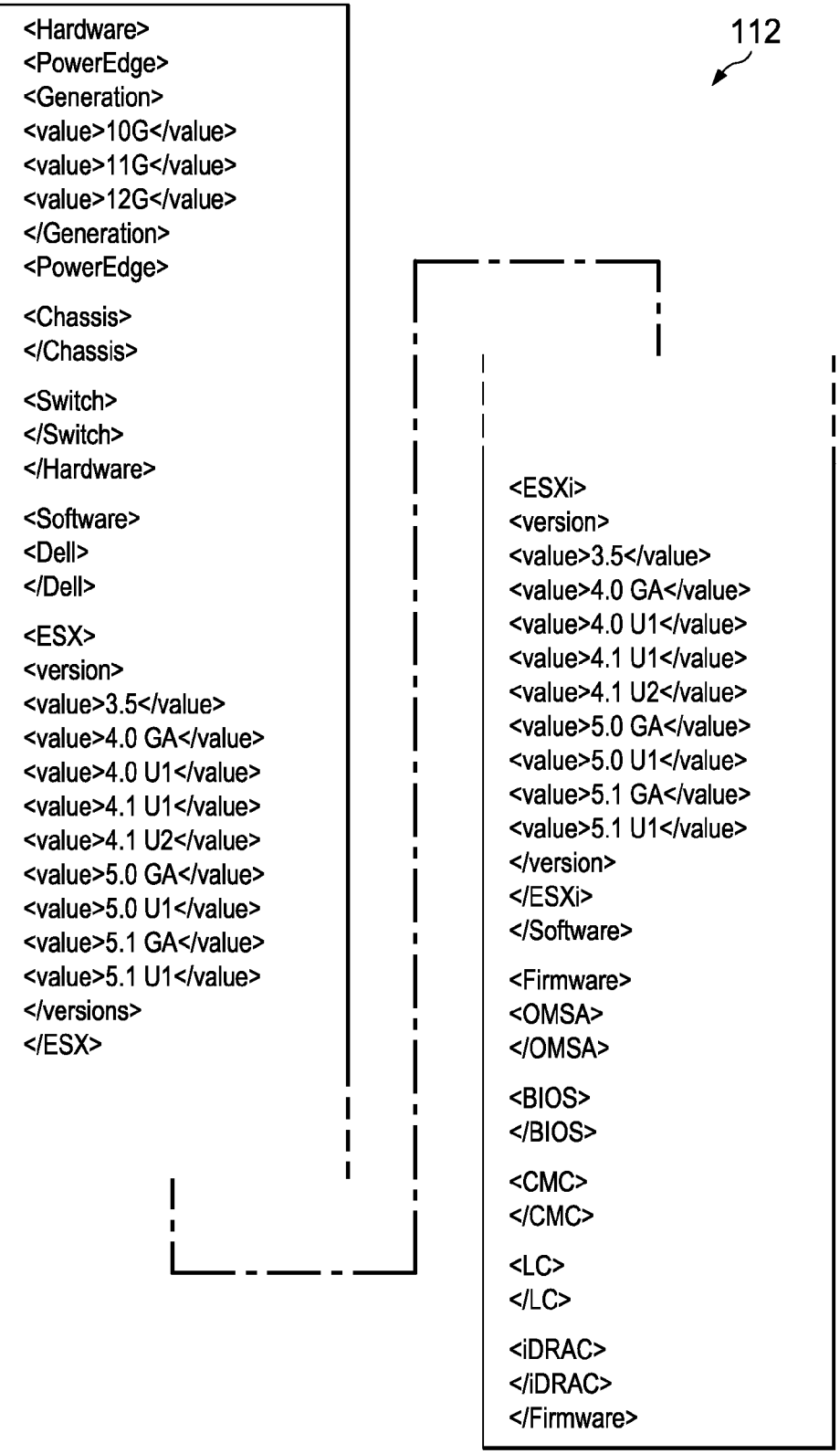
FIG. 2 illustrates an example support matrix file utilized in the system set forth in FIG. 1, in accordance with embodiments of the present disclosure.

In some embodiments, support matrix 112 may be in the form of an eXtensible Markup Language (XML) file, such as shown in FIG. 2. In such an XML file, various XML tags may be used to set forth identities of versions or patches supported by application program 110. In addition, although not shown in FIG. 2, various XML tags may be used to explicitly set forth identities of versions or patches not supported by application program 110. Thus, using support matrix 112, an application program 110 man easily maintain and control the contents of support matrix 112 effectively and dynamically for every release, as described in greater detail below. In addition, using Simple Object Access Protocol (SOAP) or similar protocol, the content of support matrix 112 may be displayed nicely and dynamically in application program 110's web user interface. Further, because support matrix is installed on user information handling system 102, its contents could be manually updated (e.g., by users of user information handling system 102) to reflect the current data if needed and the existing code for application program 110 would still support it.

Turning again to FIG. 1, network interface 114 may comprise any suitable system, apparatus, or device operable to serve as an interface between client information handling system 102 and another information handling system (e.g., provider information handling system 122) and/or network 116. Network interface 114 may enable information handling system 102 to communicate using any suitable transmission protocol and/or standard, including without limitation those protocols and standards set forth below with regard to network 116. In these and other embodiments, network interface 114 may comprise a network interface card.

Network 116 may be a network and/or fabric configured to couple information handling systems 102, 122 to each other and/or one or more other information handling systems. In some embodiments, network 116 may include a communication infrastructure, which provides physical connections, and a management layer, which organizes the physical connections and information handling systems communicatively coupled to network 116. Network 116 may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or any other appropriate architecture or system that facilitates the communication of signals, data and/or messages (generally referred to as data). Network 116 may transmit data using any storage and/or communication protocol, including without limitation, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or any other transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 116 and its various components may be implemented using hardware, software, or any combination thereof.

In some embodiments provider information handling system 122 may comprise a server. In other embodiments, information handling system 122 may be a personal computer (e.g., a desktop computer, a laptop, notebook, tablet, handheld, smart phone, personal digital assistant, etc.). As depicted in FIG. 1, information handling system 122 may include a processor 123, a memory 124 communicatively coupled to processor 123, and a network interface 134 communicatively coupled to processor 123. In addition to processor 123, memory 124 and network interface 134, information handling system 122 may include one or more other information handling resources.

Processor 123 may include any system, device, or apparatus configured to interpret and/or execute program instructions and/or process data, and may include, without limitation, a microprocessor, microcontroller, DSP, ASIC, or any other digital or analog circuitry configured to interpret and/or execute program instructions and/or process data. In some embodiments, processor 123 may interpret and/or execute program instructions and/or process data stored in memory 124 and/or another component of information handling system 122.

Memory 124 may be communicatively coupled to processor 123 and may include any system, device, or apparatus configured to retain program instructions and/or data for a period of time (e.g., computer-readable media). Memory 124 may include RAM, EEPROM, a PCMCIA card, flash memory, magnetic storage, opto-magnetic storage, or any suitable selection and/or array of volatile or non-volatile memory that retains data after power to information handling system 122 is turned off.

As shown in FIG. 1, memory 124 may have stored thereon patch data 126. Patch data 126 may include any table, database, map, or other data structure setting forth the identities of one or more various versions and/or certified patches of a hypervisor or operating system.

Network interface 134 may comprise any suitable system, apparatus, or device operable to serve as an interface between client information handling system 122 and another information handling system (e.g., user information handling system 102) and/or network 116. Network interface 134 may enable information handling system 122 to communicate using any suitable transmission protocol and/or standard, including without limitation those protocols and standards set forth above with regard to network 116. In these and other embodiments, network interface 134 may comprise a network interface card.

In operation, information regarding supported hypervisors, operating systems, and patches thereof may be maintained in support matrix 112. From time to time (e.g., on a periodic basis), application program 110 or another program may update support matrix 112 with the identities of supported hypervisors, operating systems, and patches by querying provider information handling system 122 for patch data 126. Patch data 126 may be maintained by a provider of a hypervisor or operating system, and may include identities of versions and patches of such hypervisor or operating system certified by the provider. As used herein, a "provider" may include a vendor, seller, manufacturer, wholesaler, factory, and/or other provider of a hypervisor or operating system.

After querying for patch data 126 and receiving patch data 126, application program 110 may populate support matrix 112 with identities of versions and patches of the hypervisor or operating system certified by the provider. Accordingly, support matrix 112 will set forth supported versions and patches of the hypervisor or operating system. Thus, when application program 110 is executed on a particular hypervisor or operating system, application program 110 can determine the current version and patch of the hypervisor or operating system upon which it is executing, and refer to support matrix 112 to determine if the particular version or patch is supported.

FIG. 3 illustrates a flow chart of an example method 300 for building a support matrix 112 associated with an application program 110, in accordance with certain embodiments of the present disclosure. According to some embodiments, method 300 may begin at step 302. As noted above, teachings of the present disclosure may be implemented in a variety of configurations of system 100. As such, the preferred initialization point for method 300 and the order of the steps comprising method 300 may depend on the implementation chosen.

At step 302, application program 110 or another suitable program of instructions may query (e.g., via network 116) provider information handling system 122 for patch data 126. In some embodiments, such query may be in the form of a web service call to a provider website hosted by provider information handling system 122, and patch data 126 may be set forth in the form of a web page (e.g., a Hypertext Transport Protocol or "HTTP" page).

At step 304, in response to the query, application program 110 may receive the patch data 126 (e.g., via network 116). For example, in embodiments in which the query is in the form of a web service call to provider information handling system 122, receipt of patch data 126 may include downloading information from a web page hosted by provider information handling system 122.

At step 306, application program 110 may update support matrix 112 based on identities of certified versions and patches set forth in patch data 126. For example, in embodiments in which support matrix 112 comprises an XML file, updating support matrix 112 may comprise adding or modifying tags indicating the identities of the supported versions or patches. After completion of step 306, method 300 may end.

Although FIG. 3 discloses a particular number of steps to be taken with respect to method 300, method 300 may be executed with greater or lesser steps than those depicted in FIG. 3. In addition, although FIG. 3 discloses a certain order of steps to be taken with respect to method 300, the steps comprising method 300 may be completed in any suitable order.

Method 300 may be implemented using information handling system 102 or any other system operable to implement method 300. In certain embodiments, method 300 may be implemented partially or fully in software and/or firmware embodied in computer-readable media.

FIG. 4 illustrates a flow chart of an example method for applying a support matrix associated with an application program, in accordance with certain embodiments of the present disclosure. According to some embodiments, method 400 may begin at step 402. As noted above, teachings of the present disclosure may be implemented in a variety of configurations of system 100. As such, the preferred initialization point for method 400 and the order of the steps comprising method 400 may depend on the implementation chosen.

At step 402, application program 110 may be invoked to execute on hypervisor 106 and/or operating system 108. At step 404, application program 110 may determine the identity of the version and/or patch of the hypervisor 106 and/or operating system 108. At step 406, application program 110 may determine if the identity of the version and/or patch appears in the support matrix 112 associated with application program 110. If the identity of the version and/or patch appears in the support matrix 112 associated with application program 110, method 400 may proceed to step 408. Otherwise method 400 may proceed to step 410.

At step 408, in response to a determination that the identity of the version and/or patch appears in the support matrix 112 associated with application program 110, application program 110 may support the hypervisor 106 and/or operating system 108 and continue execution of the functionality of application program 110 on the hypervisor 106 and/or operating system 108. After completion of step 408, method 400 may end.

At step 410, in response to a determination that the identity of the version and/or patch does not appear in the support matrix 112 associated with application program 110, application program 110 may give an indication that the hypervisor 106 and/or operating system 108 is not supported (e.g., generate an error message and/or terminate execution of application program 110). After completion of step 410, method 400 may end.

Although FIG. 4 discloses a particular number of steps to be taken with respect to method 400, method 400 may be executed with greater or lesser steps than those depicted in FIG. 4. In addition, although FIG. 4 discloses a certain order of steps to be taken with respect to method 400, the steps comprising method 400 may be completed in any suitable order.

Method 400 may be implemented using information handling system 102 or any other system operable to implement method 400. In certain embodiments, method 400 may be implemented partially or fully in software and/or firmware embodied in computer-readable media.

Although the present disclosure has been described in detail, it should be understood that various changes, substitutions, and alterations can be made hereto without departing from the spirit and the scope of the disclosure as defined by the appended claims.

What is claimed is:

1. An information handling system comprising:
a processor;
computer-readable media, communicatively coupled to the processor, including processor-executable instructions including:
hypervisor instructions for a hypervisor configured to present virtualized representations of information handling system resources as one or more virtual machines;
operating system instructions for an operating system associated with one or more guest operating systems corresponding to the one or more virtual machines;
application program instructions for an application program executing within a particular virtual machine and a particular guest operating system, wherein the application program instructions, when executed, cause the processor to perform application program operations, including:
maintaining, based on patch data received from a provider of the hypervisor or the operating system, a support matrix file corresponding to the application program, wherein the support matrix file includes one or more support matrix tags indicating versions and patches for one or more supported environments, and wherein maintaining the support matrix file includes:
querying the provider of the hypervisor or the provider of the operating system for the patch data, wherein the patch data identifies version and patch information indicative of identities of versions and patches of the hypervisor or operating system certified by the provider, and further wherein querying the provider includes sending a web service call to a provider website hosted by the provider, wherein the patch data comprises web page data;
downloading the web page data; and
based on the web page data, updating one or more of the one or more support matrix tags;
wherein each of the one or more supported environments includes at least one of:
one or more supported versions or patches of the hypervisor; and
one or more supported versions or patches of the operating system;
identifying a present operating environment of the information handling system, wherein the present operating environment includes at least one of:
a version or patch of the hypervisor; and
a version or patch of the operating system;
determining from the support matrix file whether the present operating environment is a supported operating environment;
responsive to determining that the present operating environment is not a supported operating environment, providing an indication that the present operating environment is not supported.

2. The information handling system of claim 1, wherein each of the one or more guest operating system comprises an instance of the operating system.

3. The information handling system of claim 1, wherein the one or more guest operating systems include two or more different types of operating systems.

4. The information handling system of claim 1, wherein providing the indication includes terminating the application program.

5. The information handling system of claim 1, wherein providing the indication comprises communicating an error message associated with the application program.

6. A method of verifying an operating environment of information handling system, the method comprising:
    maintaining, by an application program executing within a particular virtual machine, comprising a virtualized representation of information handling resources presented by a hypervisor of an information handling system, and a particular guest operating system corresponding to the particular virtual machine, based on patch data received from a provider of the hypervisor or an operating system associated with the particular guest operating system, a support matrix file corresponding to the application program, wherein the support matrix file includes one or more support matrix tags indicating versions and patches for one or more supported environments, and wherein maintaining the support matrix file includes:
        querying the provider of the hypervisor or the provider of the operating system for the patch data, wherein the patch data identifies version and patch information indicative of identities of versions and patches of the hypervisor or operating system certified by the provider, and further wherein querying the provider includes sending a web service call to a provider website hosted by the provider, wherein the patch data comprises web page data;
        downloading the web page data; and
        based on the web page data, updating one or more of the one or more support matrix tags;
    wherein each of the one or more supported environments includes at least one of:
        one or more supported versions or patches of the hypervisor; and
        one or more supported versions or patches of the operating system;
    identifying a present operating environment of the information handling system, wherein the present operating environment includes at least one of:
        a version or patch of the hypervisor; and
        a version or patch of the operating system;
    accessing the support matrix file to determine whether the present operating environment is a supported operating environment;
    responsive to determining that the present operating environment is not a supported operating environment, providing an indication that the present operating environment is not supported.

7. The method of claim 6, wherein each of the one or more guest operating systems comprises an instance of the guest operating system.

8. The method of claim 6, wherein the one or more guest operating systems include two or more different types of operating systems.

9. The method of claim 6, wherein providing the indication includes terminating the application program.

10. The method of claim 6, wherein providing the indication comprises communicating an error message associated with the application program.

* * * * *